(12) United States Patent
Bellofatto et al.

(10) Patent No.: US 8,838,067 B2
(45) Date of Patent: Sep. 16, 2014

(54) ACCOUNT AND ASSET LOADER TOOL (75) Inventors: Alberto Bellofatto, Cesano Maderno (Mb) (IT); Andrea Angeletti, Rome (IT)

(73) Assignee: Accenture Global Services Limited, Dublin (IE)

( * ) Notice: Subject to any disclaimer, the term of this patent is extended or adjusted under 35 U.S.C. 154(b) by 205 days.

(21) Appl. No.: 13/017,444

(22) Filed: Jan. 31, 2011

(65) Prior Publication Data

US 2012/0028601 A1 Feb. 2, 2012

(30) Foreign Application Priority Data

Jul. 29, 2010 (EP) .................................... 10425262

(51) Int. Cl.
- *H04M 11/00* (2006.01)
- *G06Q 20/14* (2012.01)
- *H04M 15/00* (2006.01)
- *H04W 4/24* (2009.01)

(52) U.S. Cl.
CPC ............... *H04M 15/00* (2013.01); *G06Q 20/14* (2013.01); *H04M 2215/52* (2013.01); *H04M 15/73* (2013.01); *H04M 15/53* (2013.01); *H04M 15/43* (2013.01); *H04M 15/50* (2013.01); *H04M 2215/0104* (2013.01); *H04M 2215/0172* (2013.01); *H04W 4/24* (2013.01); *H04M 2215/56* (2013.01); *H04M 15/46* (2013.01); *H04M 15/41* (2013.01); *H04M 15/51* (2013.01); *H04M 2215/54* (2013.01); *H04M 2215/0164* (2013.01); *H04M 15/44* (2013.01); *H04M 2215/7072* (2013.01); *H04M 15/59* (2013.01); *H04M 2215/0152* (2013.01); *H04M 15/80* (2013.01)
USPC ........... 455/406; 455/405; 455/407; 455/408; 719/331

(58) Field of Classification Search
CPC ................................. H04W 4/24; H04W 4/26
USPC .................. 455/406, 405, 407, 408; 719/331
See application file for complete search history.

(56) References Cited

U.S. PATENT DOCUMENTS

| 2002/0082991 A1 | 6/2002 | Friedman et al. |
| 2003/0099337 A1 | 5/2003 | Lord |

(Continued)

FOREIGN PATENT DOCUMENTS

| EP | 1 492 321 A1 | 12/2004 |
| WO | WO 2005/020027 A2 | 3/2005 |

(Continued)

OTHER PUBLICATIONS

European Search Report and Written Opinion on European Patent Application No. EP 10 42 5262 dated Jan. 17, 2011.

*Primary Examiner* — Wayne Cai
*Assistant Examiner* — Chuck Huynh
(74) *Attorney, Agent, or Firm* — Brinks Gilson & Lione (57) ABSTRACT

A system that enables reconciliation of accounts between a mobile virtual network operator (MVNO) and a mobile host operator (MHO) includes an asset loader server that receives data that defines a user event. The asset loader server generates a wholesale bill associated with the user event. The rate charged in the generated wholesale bill is based on a negotiated rate between the MVNO and the MHO that is different that the may be different than the rate at which the MVNO charges the user. The asset loader communicates the generated wholesale bill to a billing interface of the MNVO that is configured to receive an extensible markup language (XML) file that defines a wholesale bill associated with the MHO. The format of the generated wholesale bill is substantially the same as the format of the XML file associated with the MHO.

18 Claims, 5 Drawing Sheets

(56) References Cited

U.S. PATENT DOCUMENTS

| | | | |
|---|---|---|---|
| 2005/0009500 A1* | 1/2005 | Ear | 455/408 |
| 2005/0044197 A1* | 2/2005 | Lai | 709/223 |
| 2005/0181796 A1 | 8/2005 | Kumar et al. | |
| 2010/0005477 A1* | 1/2010 | Bovet et al. | 719/313 |
| 2010/0188994 A1* | 7/2010 | Raleigh | 370/252 |
| 2010/0197266 A1* | 8/2010 | Raleigh | 455/406 |
| 2011/0010457 A1* | 1/2011 | Tanttu et al. | 709/226 |

FOREIGN PATENT DOCUMENTS

| | | |
|---|---|---|
| WO | WO 2006/084944 A1 | 8/2006 |
| WO | WO 2009/137882 A1 | 11/2009 |

* cited by examiner

ACCOUNT AND ASSET LOADER TOOL

RELATED APPLICATIONS

This application claims the benefit under 35 U.S.C. §119 to the filing date of European Application No. 10 425 262.2, filed Jul. 29, 2010, the contents of which of hereby incorporated by reference in their entirety.

BACKGROUND

1. Technical Field

This present invention relates generally to reconciling billing data in a telecommunications network. More specifically, the present invention concerns implementing a system that enables the reconciliation of accounts between a mobile virtual network operator ("MVNO") and a mobile host operator ("MHO").

2. Related Art

The telecommunications industry has grown at record speed over the last several years. More and more consumers and businesses are relying on communication techniques that are available over mobile networks. These consumers and businesses are demanding up-to-the-minute accuracy of their accounts to ensure they are fully aware of the costs associated with their mobile activity. To stay competitive, telecommunications companies respond to these needs. Therefore, the ability to accurately bill customers for their usage of telecommunications networks is a fundamental function for a telecommunications provider.

A mobile host operator (MHO), such as a cellular telephone network provider, has the frequency and network capabilities to provide services for mobile subscribers. Generally, an MHO acquires a radio spectrum license from the government of the country it wishes to operate in. MHOs have their own mobile infrastructure and can operate their own network routing. While MHOs have the bandwidth and permission to supply the mobile networks, in some instances they do not have the business capabilities or resources to manage businesses and end-user needs and/or the ability to fully commercialize the radio spectrum license they have been granted.

In an effort to more fully commercialize a radio spectrum license, the MHO may contract with one or more third-party service providers that provide services to end-users. For example, an investing service may provide applications and/or hardware for performing stock transactions to end-user clients. The applications and/or hardware may communicate with one or more servers operated by the service provider via the network infrastructure provided by an MHO. In some instances, the end-user only contracts and deals with the service provider and is not even aware that the MHO, rather than the service provider, is providing the network infrastructure. These types of service providers are hereinafter referred to as mobile virtual network operators (MVNO).

In the arrangement described above, an MHO may send a bill to the MVNO that reflects network usage associated with the MVNO's clients. However, in some instances, the bill may not accurately reflect the actual usage by the MVNO's clients. It may be difficult for an MVNO with a large number of clients to ascertain the accuracy of the bill.

SUMMARY

One aspect of the present invention regards, a system and corresponding computer-implemented method that enables reconciliation of accounts between a mobile virtual network operator (MVNO) and a mobile host operator (MHO) where the system includes an asset loader server that receives data that defines a user event. The asset loader server generates a wholesale bill associated with the user event. The rate charged in the generated wholesale bill is based on a negotiated rate between the MVNO and the MHO that may be different than the rate at which the MVNO charges the MVNO clients. The asset loader server communicates the generated wholesale bill to a billing interface of the MVNO that is configured to receive an extensible markup language (XML) file that defines a wholesale bill associated with the MHO. The format of the generated wholesale bill is substantially the same as the format of the XML file associated with the MHO.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

BRIEF DESCRIPTION OF THE DRAWINGS

The accompanying drawings form part of the specification and show, by way of illustration, specific exemplary embodiments. The modules in the figures are not necessarily to scale, emphasis instead being placed upon illustrating the principles of the invention. Moreover, in the figures, like-referenced numerals designate corresponding parts throughout the different views. The principles described herein may, however, be embodied in many different forms, and this specification should not be construed to limit the claims. Rather, these embodiments are provided so that the disclosure will be thorough and complete to those skilled in the art.

DETAILED DESCRIPTION

The exemplary embodiments below describe an asset loader server. Generally, the asset loader server is configured to retrieve data that defines individual retail accounts associated with MVNO clients from an audit/tracking table database of a billing system operated by the MVNO. The asset loader then generates an XML structured file that defines a wholesale bill for each retail account based on information defined in a contract between an MHO and the MVNO. The asset loader server then communicates the XML file to the billing system of the MVNO via a billing interface of the billing system. The billing interface is configured to receive an XML structured file from an HMO that defines a wholesale bill. The XML format of the generated wholesale bill generated by the asset loader server is structured in a similar manner to the XML file communicated from the MHO so that the billing interface of the billing system does not have to be reconfigured.

The describe embodiments advantageously allow for easy reconsolidation of bills communicated by the MHO to the MVNO for services of the MHO utilized by MVNO clients, which are difficult if not impossible to manually reconcile. Another advantage is that asset loader server generates and communicates virtual bills associated with each MVNO client to a billing system that may be configured to reconcile the MHO bill via the interface of the billing system that receives bills from the MHO. In other words, no reconfiguration of the billing system is necessary.

Figure 1:
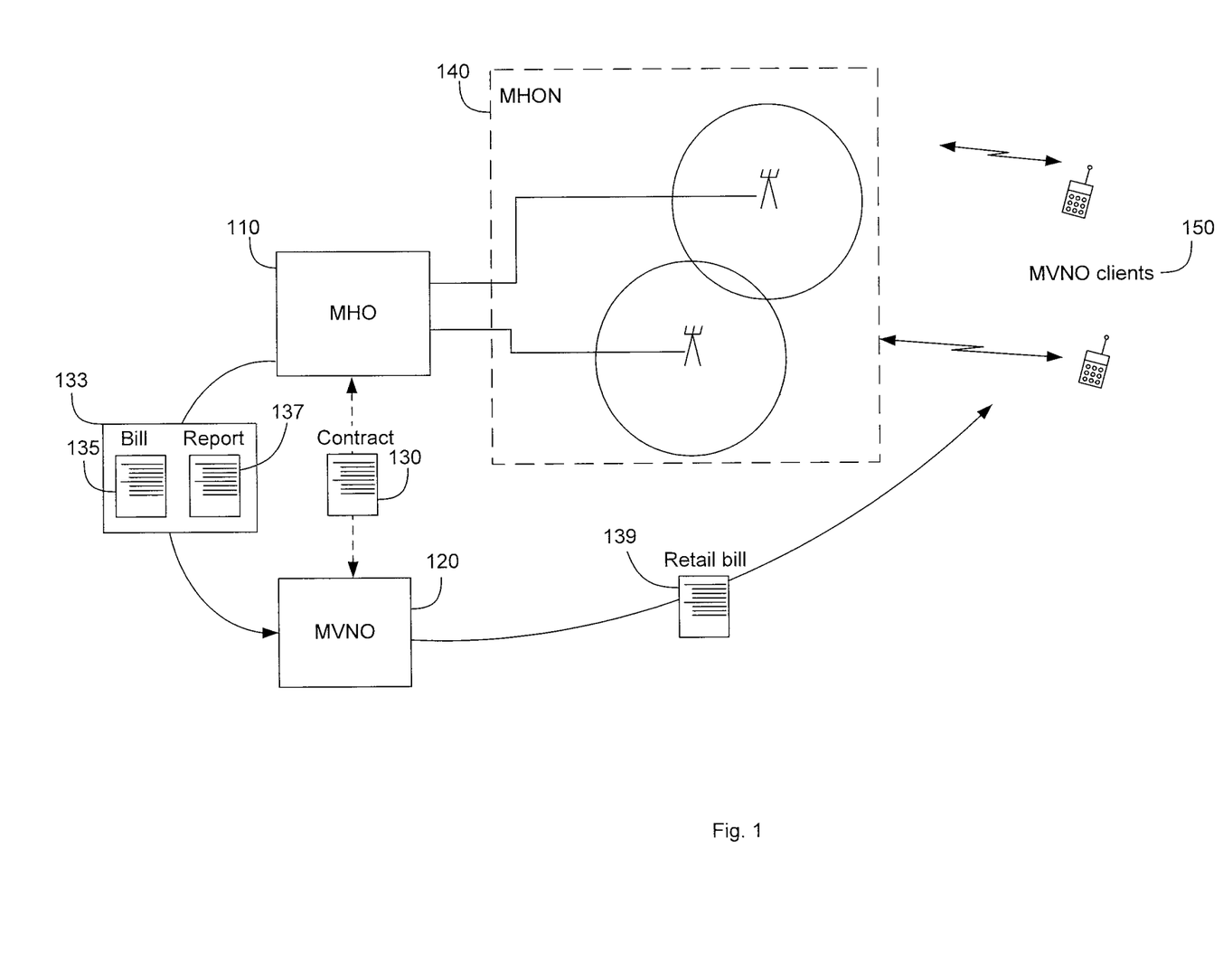
FIG. 1 illustrates an exemplary MHO/MVNO environment.

FIG. 1 illustrates an MHO/MVNO environment 100. Shown are an MHO 110, an MVNO 120, a contract 130, a Mobile Host Operator Network ("MHON") 140, and one or more MVNO clients 150. As described above, the MHO 110 may own and operate network infrastructure, such as the MHON 140. The MVNO 120 may enter into a contract 130 with the MHO 110 to gain access to the MHON 140 to provide mobile services to MVNO clients 150.

The contract 130 between the MHO 110 and MVNO 120 may require that all network traffic associated with MVNO clients 150 be charged to MVNO 120 according to contracted tariff plans, or billing plans, negotiated between the MHO 110 and the MVNO 120. The tariff plans in the contract 130 are sometimes referred to as a wholesale catalog. The wholesale catalog contains pricing rules for each service provided by the MHO that is used by the MVNO clients 150. The wholesale catalog includes pricing rules for various events generated by an MVNO client 150, such as termination and markup events. A termination event represents a fee that the MVNO 120 pays to the MHO 110 for each event that starts with or arrives at an MVNO client 150 using the MHO network 140. A markup event represents a fee that the MHO 110 pays to the MVNO 120 for each event which arrives at the MVNO 120 clients 150 that crosses the MHO 110 network but begins at a different MHO carrier's network. Each event generated by an MVNO client 150 is associated with one or both of the above events.

The MHO 110 may track all of the network activity associated with all the MVNO clients 150. The MHO 110 may send an MHO report 137 of all such activity in a batch manner to a billing system of the MVNO 120. The MHO report 137 may list all of the expenses associated with the MVNO client's 150 usage of the MHON 140. For example, the MHO report 137 may include a listing of dates and an amount of network time used by MVNO clients 150. Alternatively, the MHO report 137 may simply report an amount that represents the total usage of the MHO 110's network by all MVNO clients 150. However, the MHO report 137 may not breakdown the usage of the MHON 140 by individual MVNO clients 150, making it difficult for the MVNO 120 to determine the accuracy of the MHO report 137 based solely on the information in the MHO report 137.

The MHO 110 also sends a single wholesale bill/invoice 135 to the MVNO 120 that is associated with the MHO report 137. The wholesale bill 135 lists the charges associated with the activities reported in the MHO report 137. These charges may be based on the contract 130 between the MHO 110 and the MVNO 120. The wholesale bill 135 and the MHO report 137 may be communicated to the MVNO 120 in an extensible markup language (XML) formatted data file 133.

In some instances, a given MVNO 120 may have thousands of MVNO clients 150. The MVNO clients 150 may be individual mobile subscribers or companies that have several subscribers that utilize cell phones, PDA's or other devices operable to communicate information via the MHON 140 to gain access to services provided by the MVNO 120. In some cases, the MVNO 120 has direct relationships with the MVNO clients 150 and handles the customer service, account setup, and related billing associated with each MVNO client 150.

The MVNO 120 determines usage data for each MVNO client 150. The usage data may include the MVNO client's 150 usage of the MVNO's 120 services (hereinafter "service usage") and usage of the MHON 140 (hereinafter "MHON usage"). For example, the MVNO 120 may determine MHON usage by determining a duration of time that a server of the MVNO 120 is accessed by the MVNO client 150, a type of service requested, an amount of data downloaded, and/or whether the services are used in-network or when roaming. After determining the usage data, the MVNO 120 may generate a retail bill 139 for each MVNO client 150. The MVNO 120 may bill each MVNO client 150 based on the amount of usage and/or the type of transaction requested by the MVNO client 150.

The retail bill 139 prepared by the MVNO 120 for each MVNO client 150 may be based on a tariff plan that is different from the tariff plan specified in the contract 130 between the MVNO 120 and the MHO 110. The tariff plan may define various rates for different types of events generated by an individual MVNO client 150. For example, the tariff plan may define a service usage rate for utilizing a specific service of the MVNO 120. The tariff plan may also define MHON usage rates associated with MHON 140 usage. The rates set forth in the tariff plan may be based on the wholesale price charged by the MHO and are hereinafter referred to as the retail price. As described below, the MVNO 120 may include a billing system that, in part, uses the retail price from the tariff plan to charge MVNO clients 150.

According to a preferred embodiment of the present invention, the MVNO 120 may compare the wholesale bill 135 communicated from the MHO 110 with the usage data for each MVNO client 150 to ensure the accuracy of the wholesale bill 135. The MVNO 120 verifies the wholesale bill 135 by comparing wholesale bill 135 with generated wholesale bills that are associated with each MVNO client 150. The MVNO 120 may include or be in communication with an asset loader server (such as asset loader server 210 described below with reference to FIG. 2) that generates a wholesale bill for each MVNO client 150. The charges listed in the generated wholesale bill for each MVNO client 150 are based, in part, on the rates defined in the contract 130 between the MHO 110 and the MVNO 120. The asset loader server may communicate the generated wholesale bill for each MVNO client 150 to a billing interface of the MVNO 120. The MVNO 120 then may sum the charges in the generated wholesale bills for each MVNO client 150 to obtain an aggregate charge for the MVNO clients 150. The MVNO 120 then may compare the aggregate charge from the generated wholesale bills with the charge listed in wholesale bill 135 to determine whether the wholesale bill 135 is accurate. In a preferred embodiment, the comparison allows for a small discrepancy between the bills. The comparison may be performed automatically by the billing system of the MVNO 120 and/or by an operator of the MVNO 120.

Figure 2:
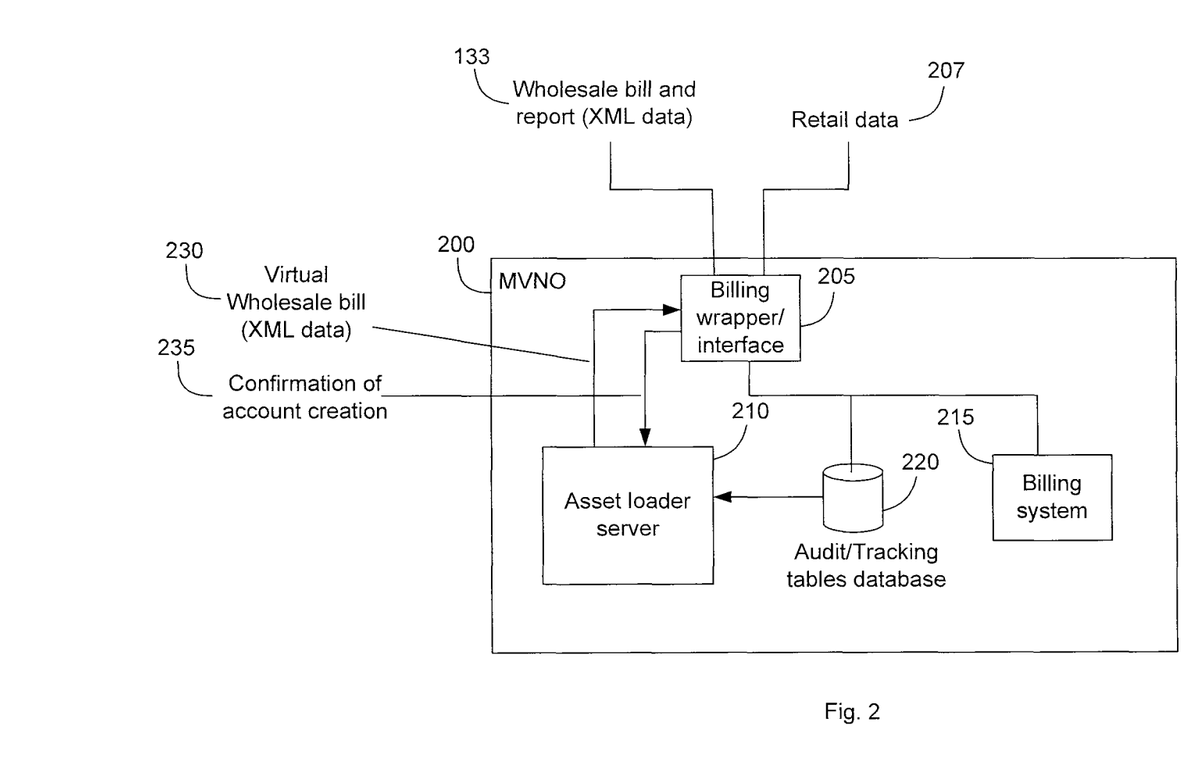
FIG. 2 illustrates an exemplary embodiment of an MVNO system architecture in accordance with the present invention.

FIG. 2 illustrates an exemplary MVNO system architecture 200, which may correspond to the MVNO 120 described above. The MVNO system architecture 200 is herein referred to as the MVNO 200. The MVNO 200 includes a billing wrapper/interface 205, an asset loader server 210, a billing system 215, and an audit/tracking tables (ATT) database 220.

The billing interface 205 may implement a set of web service functions that are utilized to interface the billing system 215 with other systems, such as a system of the MHO 110 (FIG. 1) that communicates the wholesale bill 135 (FIG. 1). The web service may define functions for receiving and interpreting files that are in an XML format, such as the wholesale bill 135. The billing interface 205 may be configured to store a received XML file and other details to the ATT database 220.

The billing interface 205 may also implement a set of web services that enable receiving retail data 207 that defines retail events initiated by MVNO clients 150, such as requests to utilize MVNO 200 application servers. The billing interface 205 stores the retail data 207 in a retail data file that may reside in the ATT database 220 or a different database. The retail data 207 may define an MVNO client ID, a time stamp associated with the event, the duration of the MHO usage, the duration of the MVNO service usage, the customer price associated with the MVNO client, transaction type identification information, and/or other data.

The billing system 215 is in communication with the billing interface 205 and the ATT database 220, and is generally configured to manage bills and revenue associated with the MVNO 200. The billing system 215 may correspond to an Oracle BRM (Billing and Revenue Management system) or a different billing system. The billing system 215 may be configured to perform a variety of billing-related functions. For example, the billing system 215 may process retail data 207 communicated via the billing interface 205 to generate invoices to be sent to MVNO clients 150 (FIG. 1). The billing system 215 may process XML formatted data file 133 (comprising wholesale bill 135 and MHO report 137) communicated by an MHO 110. For example, the billing system 215 may determine an amount specified in a wholesale bill 135 from an MHO 110 and may direct funds from a bank account of the MVNO 120 to the MHO 110. The billing system 215 may be configured to create a virtual wholesale account for each MVNO client 150 when a generated wholesale bill for the MVNO client 150 is received for the first time from, for example, the asset loader server 210. Once the virtual wholesale account for a particular MVNO client 150 is created, billing system 215 may be configured to update the account when a new generated wholesale bill is received from the asset loader server 210.

The billing system 215 may also be configured to reconcile the generated wholesale bills communicated by the asset loader server 210 for each MVNO client 150 with a wholesale bill 135 communicated from the MHO for all the MVNO clients 150. For example, the billing system 215 may total the charges in the generated wholesale bill generated for each MVNO client 150 to obtain a total charge and compare the total charge with charges in the wholesale bill 135. The billing system 215 may be configured to perform other billing-related functions.

The asset loader sever 210 is in communication with the billing interface 205 and the ATT database 220, and is configured to generate and communicate an XML formatted wholesale bill 230 for each MVNO client 150 to the billing interface 205 based on retail data 207 stored in the ATT database 220. The billing interface 205 may then communicate the generated wholesale bill 230 to the billing system 215 to create or update a virtual wholesale account associated with each of the respective MVNO clients 150.

In operation, the asset loader server 210 creates a virtual wholesale account to represent the MHO 110. Then, the asset loader server 210 generates a wholesale bill 230 for each MVNO client retail account located in the ATT database 220. The generated wholesale bill 230 defines the MVNO client 150 usage data in terms of the rates defined in the contract 130 between the MHO 110 and the MVNO 120. In other words, the rate defined in the contract 130 is used for the rate in the generated wholesale bill 230. Each time an MVNO client 150 triggers an event, the billing system 215 updates a retail account balance according to the tariff plan between the MVNO 120 and the MVNO clients 150, and a wholesale account balance associated with the MNVO client 150 according to the contract 130 between the MHO 110 and the MVNO 120.

In some implementations, the asset loader server 210 resides within the MVNO system. In other implementations, the asset loader server 210 may reside outside of the MVNO 120 and may be communicated with the MVNO system via a network, such as the Internet.

Figure 3:
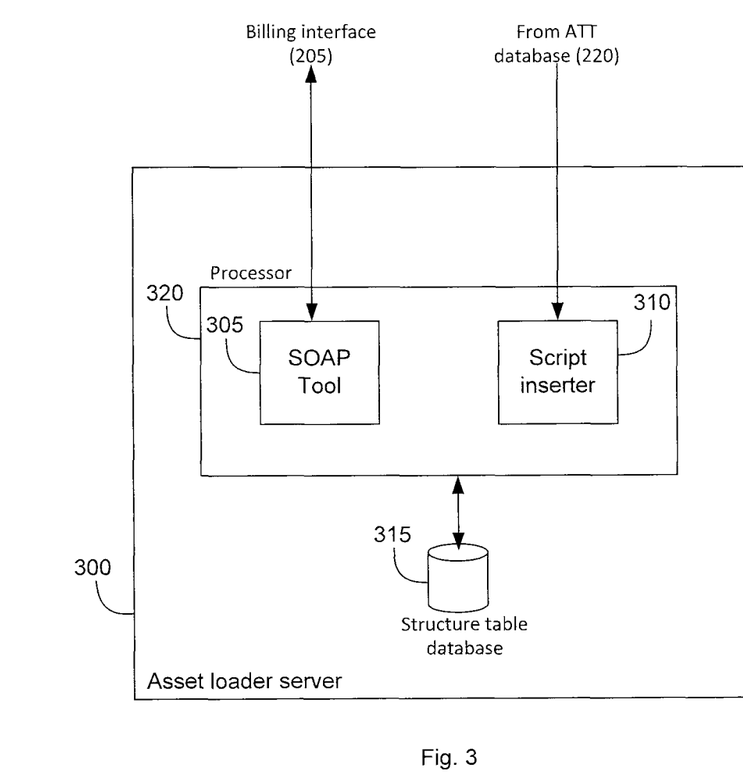
FIG. 3 illustrates an exemplary embodiment of an asset loader server to be used with the MVNO system architecture of FIG. 2 in accordance with the present invention.

FIG. 3 illustrates an exemplary asset loader server 300, which may correspond to the asset loader server 210 (FIG. 2) described above. The asset loader server 300 includes a processor 320 and a structure table database 315. The processor 320 may correspond to an Intel®, AMD®, or PowerPC® based computer or a different computer. The processor 320 may include an operating system, such as a Microsoft Windows®, Linux, or other Unix® based operating system. The processor may be configured to communicate with other computers via an interface. For example, the processor may include a network interface that enables communications between the asset loader server 300 and the billing interface 205, the ATT database 220, the billing system 215, or any other system described herein.

The processor 320 may include code and logic that implements a Simple Object Access Protocol (SOAP) based tool 305. The SOAP tool 305 is operable to create, modify, update, delete, and perform other functions on XML files communicated from the billing interface 205 (FIG. 2). The SOAP tool 305 is further configured to communicate restructured XML files to the billing interface 205. The restructured XML files are derived from the retail account to manage wholesale accounts on a billing system. The SOAP tool 305 updates the structure table database 315 with the response received by the billing interface or wrapper 205 (FIG. 2) by communicating an update request to the billing wrapper, such as an SQL update request.

For each MVNO account, the SOAP tool 305 generates al wholesale XML SOAP file and sends a request to the billing interface 205 to process the XML SOAP file. Each generated wholesale XML SOAP file represents a virtual wholesale account associated with an MVNO client account. The generated wholesale XML SOAP file contains a wholesale pricing rule based on the contract 130 between the MVNO 120 and the MHO 110. The billing interface 205 (FIG. 1) processes the request and sends a response to the SOAP tool 305. The SOAP tool 305 is configurable to perform several parallel processes, creating a large number of XML files in a matter of seconds. This feature reduces the resources that are necessary and improves performance.

The processor 320 also includes code and logic that implements a script executor 310. The script executor 310 is operable to execute a script such as a structured query language ("SQL") script 420. For example, the script inserter 310 may implement a relational database management system such as Microsoft SQL Server.

The script may be operable to cause the script executor 310 to extract the retail data 207 stored in the ATT database 220, format the retail data 207, and insert the formatted retail data 207 into the structure table database 315.

The XML format generated by the script executor 310 is used to manage retail customers and wholesale customers. Each entry in the structure table of the structure table database 315 represents a specific kind of operation for maintaining each account asset. Each row in the structure table specifies XML details that need to be processed as well as the results of the performed operations.

Figure 4:
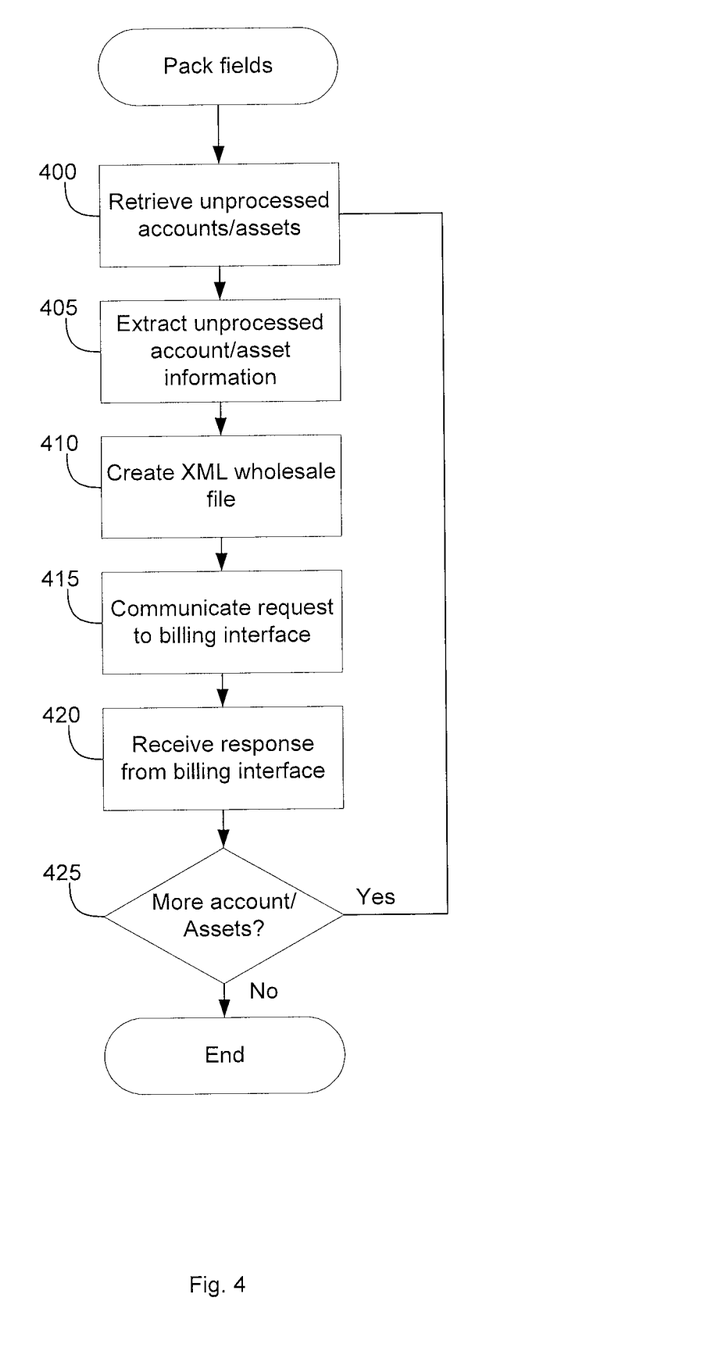
FIG. 4 illustrates exemplary operations of the asset loader server of FIG. 3.

FIG. 4 illustrates exemplary operations of the asset loader server 300 (FIG. 3) that can be performed in the MVNO 200 of FIG. 2. At block 400, unprocessed accounts and assets may be determined. For example, the script inserter 310 may extract unprocessed retail account data from the ATT database 220 and insert the data into the structure table database 315.

At block 405 the SOAP tool 305 may extract the unprocessed retail accounts and assets from the structure table database 315.

At block 410, the SOAP tool 305 may generate a wholesale bill according to an XML structure. The format of the generated wholesale bill may be structured in the same XML format as a wholesale bill communicated from an MHO 110 (FIG. 1).

At block 415, the SOAP tool 305 may communicate a request to the billing interface 205 for billing account and asset creation. The SOAP tool 305 may communicate the XML formatted wholesale file generated at block 410 along with the request.

At block 420, the SOAP tool 305 may receive a response from the billing interface 205. The response may indicate that the billing account and asset have been created successfully within the MVNO billing system.

At block 425, if there are additional accounts to analyze, the operations repeat from block 400. Otherwise, the operations end. In some implementations, the operations from block 400 may be executed on a periodic basis, such as daily or weekly. The operations may be performed at other intervals as well.

Figure 5:
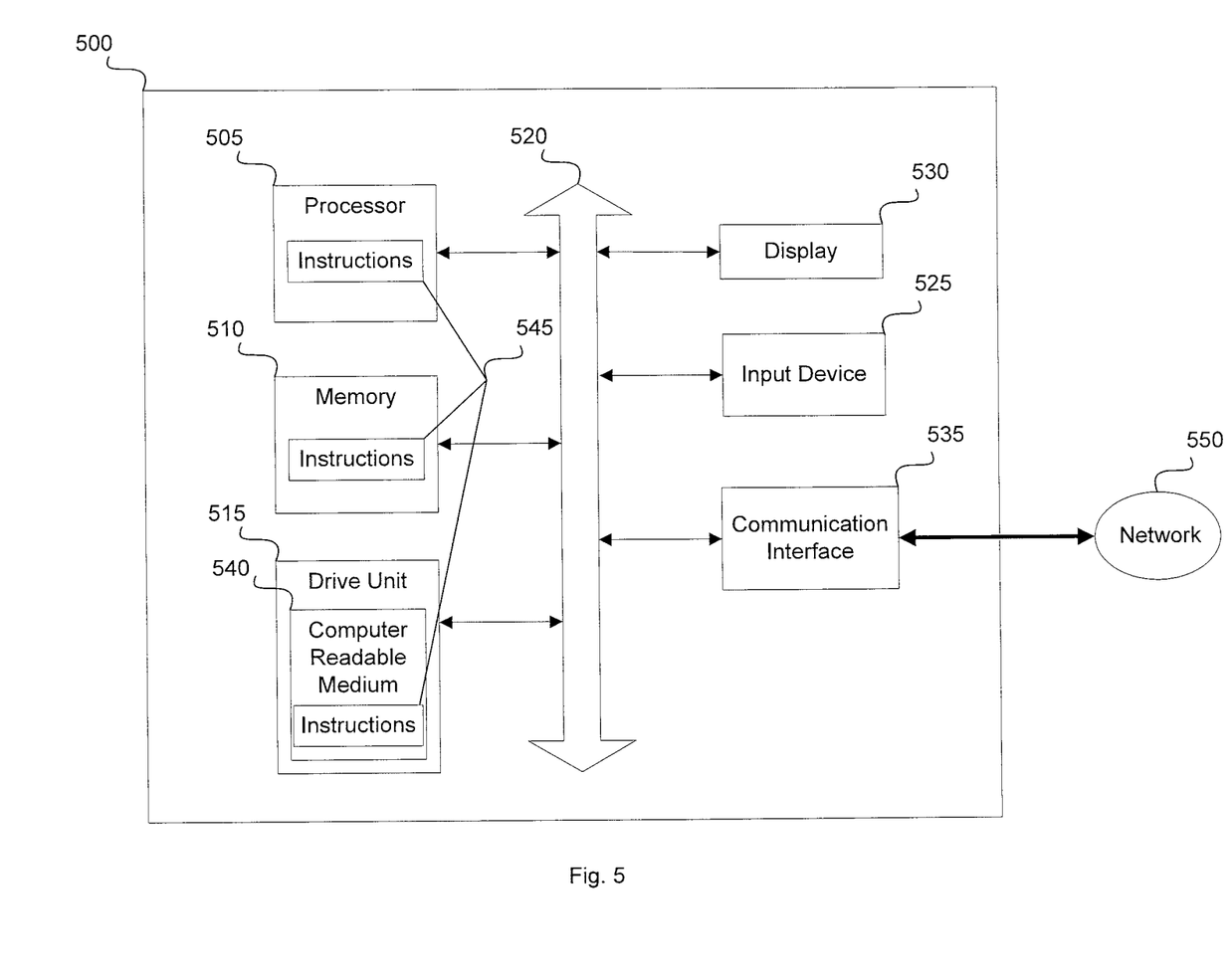
FIG. 5 illustrates a general computer system, which may represent any computing devices referenced herein.

FIG. 5 illustrates a general computer system 500, which may represent the processor 320 (FIG. 3) of the asset loader server 300 (FIG. 3) or any other computing devices referenced herein. The computer system 500 may include a set of instructions 545 that may be executed to cause the computer system 500 to perform any one or more of the methods or computer-based functions disclosed herein. The computer system 500 may operate as a stand-alone device or may be connected, e.g., using a network, to other computer systems or peripheral devices.

In a networked deployment, the computer system 500 may operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile device, capable of executing a set of instructions 545 (sequential or otherwise) that specify actions to be taken by that machine. Further, each of the systems described may include any collection of sub-systems that individually or jointly execute a set, or multiple sets, of instructions to perform one or more computer functions.

The computer system 500 may include one or more memory devices 510 on a bus for communicating information, such as the ATT database 220 and/or the structure table database 315. In addition, code operable to cause the computer system to perform any of the acts or operations described herein may be stored in the memory 510. The memory 510 may be a random-access memory, read-only memory, programmable memory, hard disk drive or any other type of memory or storage device.

The computer system 500 may include a display 530, such as a liquid crystal display (LCD), a cathode ray tube (CRT), or any other display suitable for conveying information. The display 530 may act as an interface for the user to see the functioning of the processor 505, or specifically as an interface with the software stored in the memory 510 or in the drive unit 515.

Additionally, the computer system 500 may include an input device 525, such as a keyboard or mouse, configured to allow a user to interact with any of the components of system 500.

The computer system 500 may also include a disk or optical drive unit 515. The disk drive unit 515 may include a computer-readable medium 540 in which one or more sets of instructions 545, e.g. software, can be embedded. Further, the instructions 545 may perform one or more of the operations as described herein. The instructions 545 may reside completely, or at least partially, within the memory 510 and/or within the processor 505 during execution by the computer system 500. The memory 510 and the processor 505 also may include computer-readable media as discussed above.

The computer system 500 may include a communication interface 535 that enables communications via a network 550. The network 550 may include wired networks, wireless networks, or combinations thereof. The communication interface 535 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown, the asset loader servers 210, 300 enable MNVOs to check the accuracy of wholesale bills communicated from MHOs. For example, the asset loader servers generate a wholesale bill associated with each MVNO client. The generated wholesale bill represents the MVNO client's 150 transactions in terms of the cost specified in the contract between the MHO 110 and the MVNO 120. The asset loader servers 210, 300 communicate the generated wholesale bill to a billing interface 205 of the MVNO 120. The format of the generated wholesale bill may match the format of wholesale bills communicated from MHO 110 to enable communicating the generated wholesale bill to the billing system without customization to the billing interface 205. The billing system may then compare the generated wholesale bills with the wholesale bill communicated from the MHO 110 to verify accuracy of the MHO wholesale bill 135.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method that facilitates reconciliation of accounts between a mobile virtual network operator (MVNO) and a mobile host operator (MHO), the method comprising:

receiving, by an asset loader server and from an MVNO database, data that defines retail account information for a plurality of MVNO clients that utilize services provided by the MVNO;

receiving, at the MVNO, an MHO wholesale bill that specifies an aggregate cost associated with usage, by the plurality of MVNO clients, of MHO services;

receiving, by the asset loader server, data that defines a wholesale catalog that defines pricing rules for each service provided by the MHO that is used by an MVNO client of the plurality of MVNO clients;

receiving, by the asset loader server and from the MVNO database, data that defines MVNO client events associated with the plurality of MVNO clients, wherein the MVNO charges each MVNO client at a retail rate associated with a corresponding client event, and wherein the MVNO stores data that defines the MVNO client events to the MVNO database when the MVNO determines that MVNO resources have been utilized by the client;

generating, by the asset loader server, a plurality of virtual wholesale bills associated with the plurality of MVNO clients based on the MVNO client events and pricing rules in the wholesale catalog, wherein each virtual wholesale bill includes a cost associated with a given MVNO client's usage of the MHO services, and wherein the virtual wholesale bill is represented in an extensible markup language (XML) file that is formatted to match a format of an MHO wholesale bill; and communicating, by the asset loader server, the virtual wholesale bills to a billing interface of the MVNO that is configured to receive the MHO wholesale bill;

accumulating the cost for each virtual wholesale bill to determine a total cost associated with the plurality of virtual wholesale bills comparing, by the billing system of the MVNO, the accumulated total cost to the aggregate cost specified in the MHO wholesale bill to thereby determine whether the accumulated total cost matches the aggregate cost.

2. The method according to claim 1, wherein the data that defines the MVNO client events is selected from the group consisting of: a user ID, a time stamp associated with the event, a duration of the usage, and a user retail price.

3. The method according to claim 1, further comprising extracting, by a scripting tool, data that defines the MVNO client events from a database of the MVNO.

4. The method according to claim 3, further comprising processing, by the scripting tool, the data that defines the MVNO client events and storing processed MVNO client event data to an asset loader server database.

5. The method according to claim 3, further comprising generating, by a Simple Object Access Protocol (SOAP) based tool, the XML file according to data stored in an asset loader server database.

6. The method according to claim 5, further comprising receiving by the SOAP based tool an acknowledgement from the billing interface that the generated wholesale bill has been processed.

7. A non-transitory machine-readable storage medium having stored thereon a computer program comprising at least one code section that facilitates reconciliation of accounts between a mobile virtual network operator (MVNO) and a mobile host operator (MHO), the at least one code section being executable by a machine for causing the machine to perform acts of:

receiving, from an MVNO database, data that defines retail account information for a plurality of MVNO clients that utilize services provided by the MVNO;

receiving an MHO wholesale bill that specifies an aggregate cost associated with usage, by the plurality of MVNO clients, of MHO services;

receiving data that defines a wholesale catalog that defines pricing rules for each service provided by the MHO that is used by an MVNO client of the plurality of MVNO clients;

receiving, from the MVNO database, data that defines MVNO client events associated with the plurality of MVNO clients, wherein the MVNO charges each MVNO client at a retail rate associated with a corresponding client event, and wherein the MVNO stores data that defines the MVNO client events to the MVNO database when the MVNO determines that MVNO resources have been utilized by the client;

generating a plurality of virtual wholesale bills associated with the MVNO client based on the plurality of MVNO clients event and pricing rules in the wholesale catalog, wherein each virtual wholesale bill includes a cost associated with a given MVNO client's usage of the MHO services, and wherein the virtual wholesale bill is represented in an extensible markup language (XML) file that is formatted to match a format of an MHO wholesale bill;

communicating the virtual wholesale bills to a billing interface of the MVNO that is configured to receive the MHO wholesale bill;

accumulating the cost for each virtual wholesale bill to determine a total cost associated with the plurality of virtual wholesale bills comparing the accumulated total cost to the aggregate cost specified in the MHO wholesale bill to thereby determine whether the accumulated total cost matches the aggregate cost.

8. The non-transitory machine-readable storage medium according to claim 7, wherein the data that defines the MVNO client events is selected from the group consisting of: a user ID, a time stamp associated with the event, a duration of the usage, and a user retail price.

9. The non-transitory machine-readable storage medium according to claim 7, wherein the at least one code section enables extracting data that defines the MVNO client events from a database of the MVNO.

10. The non-transitory machine-readable storage medium according to claim 9, wherein the at least one code section enables generating the XML file according to data stored in an asset loader server database.

11. The non-transitory machine-readable storage medium according to claim 10, wherein the at least one code section enables receiving an acknowledgement from the billing interface that the generated wholesale bill has been processed.

12. The non-transitory machine-readable storage medium according to claim 7, wherein the at least one code section enables processing the data that defines the MVNO client events and storing processed MVNO client event data to an asset loader server database.

13. A system that facilitates reconciliation of accounts between a mobile virtual network operator (MVNO) and a mobile host operator (MHO), the system comprising:
    an asset loader server configured to
        receive, from an MVNO database, data that defines retail account information for a plurality of MVNO clients that utilize services provided by the MVNO;
        receive data that defines a wholesale catalog that defines pricing rules for each service provided by the MHO that is used by an MVNO client of the plurality of MVNO clients;
        receive from the MVNO database data that defines MVNO client events associated with the plurality of MVNO clients, wherein the MVNO charges each MVNO client at a retail rate associated with a corresponding client event, and wherein the MVNO stores data that defines the MVNO client events to the MVNO database when the MVNO determines that MVNO resources have been utilized by the client;
        generates a plurality of virtual wholesale bills associated with the plurality of MVNO clients based on the MVNO client events and pricing rules in the wholesale catalog, wherein each virtual wholesale bill includes a cost associated with a given MVNO client's usage of the MHO services, and wherein the virtual wholesale bill is represented in an extensible markup language (XML) file that is formatted to match a format of an MHO wholesale bill;
        wherein the asset loader server is further configured to communicate the virtual wholesale bills to a billing interface of a billing system of the MNVO that is configured to receive the MHO wholesale bill; and
    a billing system configured to accumulate the cost for each virtual wholesale bill to determine a total cost associated with the plurality of virtual wholesale bills; and
        compare the accumulated total cost to an aggregate cost specified in the MHO wholesale bill, the aggregate cost being associated with usage, by the plurality of MVNO clients, of MHO services, to thereby determine whether the accumulated total cost matches the aggregate cost.

14. The system according to claim 13, wherein the data that defines the MVNO client events is selected from the group consisting of: a user ID, a time stamp associated with the event, a duration of the usage, and a user retail price.

15. The system according to claim 13, further comprising a scripting tool configured to extract data that defines the MVNO client events from a database of the MVNO.

16. The system according to claim 15, wherein the scripting tool is further configured to process the data that defines the MVNO client events and store processed MVNO client event data to an asset loader server database.

17. The system according to claim 15, further comprising code and logic that implements a Simple Object Access Protocol (SOAP) based tool that is configured to generate the XML file according to data stored in an asset loader server database.

18. The system according to claim 17, wherein the SOAP based tool is further configured to receive an acknowledgement from the billing interface that the generated wholesale bill has been processed.

* * * * *